United States Patent
Cooley (10) Patent No.: US 8,004,665 B2
(45) Date of Patent: Aug. 23, 2011

(54) ENERGY MEASUREMENT SYSTEM AND METHOD

(75) Inventor: Dirk D. Cooley, Ogden, UT (US)

(73) Assignee: Lumenis, Ltd., Yokneam (IL)

( * ) Notice: Subject to any disclaimer, the term of this patent is extended or adjusted under 35 U.S.C. 154(b) by 479 days.

(21) Appl. No.: 12/131,553

(22) Filed: Jun. 2, 2008

(65) Prior Publication Data

US 2009/0296079 A1    Dec. 3, 2009

(51) Int. Cl.
*G01J 1/42* (2006.01)

(52) U.S. Cl. ... 356/221; 356/215; 356/226; 250/370.01; 250/370.09

(58) Field of Classification Search ............. 250/370.01–370.09; 356/215–226
See application file for complete search history.

(56) References Cited

U.S. PATENT DOCUMENTS

| | | | |
|---|---|---|---|
| 3,687,558 A * | 8/1972 | Rex | 356/224 |
| 3,750,670 A | 8/1973 | Palanos et al. | 128/303.1 |
| 4,530,600 A | 7/1985 | Lopez | 356/5 |
| 5,703,713 A | 12/1997 | Leong et al. | 359/352 |
| 7,521,682 B1 * | 4/2009 | Holland et al. | 250/370.01 |
| 2004/0215175 A1 | 10/2004 | Feklistov et al. | 606/4 |
| 2007/0093794 A1 | 4/2007 | Wang et al. | 606/6 |

* cited by examiner

Primary Examiner — Gregory J Toatley
Assistant Examiner — Iyabo S Alli
(74) Attorney, Agent, or Firm — Mintz, Levin, Cohn, Ferris, Glovsky and Popeo, P.C.

(57) ABSTRACT

Disclosed is a system to measure the energy level of a radiation pulse. The system includes a sample-and-hold module to measure the radiation pulse and to generate a signal representative of an energy level of the radiation pulse, and a processing module to determine an energy value of the radiation pulse based on the signal generated by the sample-and-hold module.

25 Claims, 7 Drawing Sheets

ENERGY MEASUREMENT SYSTEM AND METHOD

BACKGROUND

The present disclosure relates to an energy measurement system, device and method, and more particularly to an energy measurement system to measure the energy level of laser radiation, including radiation level of short-pulsed laser beams.

Generally, systems to measure the energy levels of laser radiation are implemented using integrator circuits (e.g., with operational amplifiers), a gain amplifier and low-pass filter. In such implementation, the integrator circuit is used to average the signal energy from a photo-detector device, such as a diode amplifier. An integrator circuit typically tracks input signals with a delay that is based on the capacitance of the integrator circuit, and thus such a circuit has a tracking delay of 1/sC. Consequently, Energy measurement systems implemented using integrator circuits experience difficulties responding and tracking signals having fast rise times and low repetition rates. For example, a short pulse laser beam requires the integrator to respond quickly and then hold the resultant signal long enough to be sampled by an analog to digital converter. A measurement system that uses an integrator device also requires the entire signal chain, including the A\D converter coupled to the integrator, to have the bandwidth and rise time necessary for fast signal acquisition so that the incoming signal is acquired and converted before a significant change in that signal's level occurs.

SUMMARY

The energy measurement systems, circuits, devices and methods described herein acquire and measure energy level of signals from short pulsed radiation emissions (e.g., laser emissions). The energy measurement system (which may be used, for example, with Selecta laser systems manufactured by Lumenis Ltd.) may be implemented as a fast sample-and-hold circuit without using integrator circuits. Such implementations provide an accurate indication of laser energy and do not require high speed or precision components.

In one aspect, a system to measure the energy level of a radiation pulse is disclosed. The system includes a sample-and-hold module to measure the radiation pulse and to generate a signal representative of an energy level of the radiation pulse, and a processing module to determine an energy value of the radiation pulse based on the signal generated by the sample-and-hold module.

Embodiments of the system may include one or more of the following features.

The sample-and-hold module may include a photodiode to generate electrical current in response to at least a portion of the radiation pulse incident on the photodiode, the level of generated electrical current being proportional to the energy level of the radiation pulse, and an energy storage component to store electrical charge of the generated electrical current. The level of electrical charge stored on the energy storage component during one period of the radiation pulse may be representative of the energy level of the radiation pulse. The energy storage component may include a capacitor.

The system may further include a gain-and-filtering module coupled to an output of sample-and-hold module. The gain-and-filtering module may be configured to amplify the signal representative of an energy level of the radiation pulse, and provide the amplified signal to the input of the processing module.

The system may further include a pulse-detect module to determine the occurrence of an emission of the radiation pulse.

The system may be implemented without an integrator circuit.

The sample-and-hold module may be configured to measure a short-pulse laser beam having a pulse duration of substantially between 1 nanosecond and 1 millisecond.

In another aspect, a system to measure the energy level of a radiation pulse is disclosed. The system includes a sample-and-hold circuit to measure the radiation pulse and to generate a signal representative of an energy level of the radiation pulse, and a processing circuit to determine an energy value of the radiation pulse based on the signal generated by the sample-and-hold module.

Embodiments of the system device may include any of the one or more features described above, as well as one or more of the following features.

The sample-and-hold circuit may include a photodiode to generate electrical current in response to at least a portion of the radiation pulse incident on the photodiode, the level of generated electrical current being proportional to the energy level of the radiation pulse, and an energy storage component to store electrical charge of the generated electrical current.

The system may further include a gain-and-filtering circuit coupled to an output of sample-and-hold circuit. The gain-and-filtering circuit may be configured to amplify the signal representative of an energy level of the radiation pulse, and provide the amplified signal to the input of the processing circuit.

In a further aspect, a radiation system to transmit radiation is disclosed. The system includes a radiation source to generate a radiation pulse, and one or more energy measurement devices. At least one of the one or more energy measurement devices includes a sample-and-hold module to measure the generated radiation pulse and to generate a signal representative of an energy level of the generated radiation pulse, and a processing module to determine an energy level of the radiation pulse based on the signal generated by the sample-and-hold module.

Embodiments of the radiation system may include any of the one or more features described above, as well as one or more of the following features.

The radiation source may include a laser device configured to generate short-pulsed laser radiation.

The sample-and-hold module of at least one of the one or more energy measurement devices may include a photodiode to generate electrical current in response to at least a portion of the radiation incident on the photodiode, the level of generated electrical current being proportional to the energy level of the generated radiation pulse, and an energy storage component to store electrical charge of the generated electrical current.

The level of electrical charge stored on the energy storage component during one period of the radiation pulse may be representative of the energy level of the radiation pulse.

The energy storage component may include a capacitor.

The at least one of the one or more energy measurement devices may further include a gain-and-filtering module coupled to an output of sample-and-hold module. The gain-and-filtering module may be configured to amplify the signal representative of the energy level of the radiation pulse, and provide the amplified signal to the input of the processing module.

The at least one of the one or more energy measurement devices may further include a pulse-detect module to determine the occurrence of an emission of the radiation pulse.

The at least one of the one or more energy measurement devices may be implemented without an integrator circuit.

The sample-and-hold module of the at least one of the one or more energy measurement devices may be configured to measure a short-pulse laser beam having a pulse duration of substantially between 1 nanosecond and 1 millisecond.

In yet another aspect, a method to measure energy level of a radiation pulse is disclosed. The method includes directing at least a portion of the radiation pulse to a sensor configured to generate a signal representative of the energy level of the radiation, maintaining the generated signal for a period of time following termination of the radiation pulse, sampling the maintained signal one or more times to generate corresponding one or more resultant signals, and processing the one or more resultant signals to produce an output signal representative of the energy level of the radiation pulse.

Embodiments of the method may include any of the one or more features described above, as well as one or more of the following features.

Directing the at least the portion of the radiation pulse may include directing the at least a portion of the radiation pulse to a photodiode configured to generate electrical current in proportion to the directed at least the portion of the radiation pulse.

Maintaining the signal for the period of time following termination of the radiation pulse may include storing the current generated by the photodiode on a storage element.

The method may further include detecting the occurrence of the radiation pulse.

Directing at least a portion of the radiation pulse may include directing at least a portion of a laser radiation pulse, the pulse having a duration of substantially between 1 nanosecond and 1 millisecond.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 1 is a block circuit diagram of an exemplary energy measurement system.

Like reference numbers and designations in the various drawings indicate like elements.

DETAILED DESCRIPTION

Described herein is a laser energy measurement system to measure the energy level of a radiation pulse generated by a radiation source, particularly the energy level of short-pulsed laser radiation. In some embodiments, the energy measurement system includes a sample-and-hold module configured to measure the radiation pulse, such as short-pulsed laser emissions, and to generate a signal representative of an energy level of the short-pulsed laser emissions. The energy measurement system also includes, in some embodiments, a processing module to determine an energy value of the short-pulsed laser beam based on the signal generated by the sample-and-hold module. In some embodiments, the energy measurement system is configured to measure the energy levels for short-pulsed laser emissions with a pulse length of 4 nanoseconds or shorter. Accordingly, in some embodiments, the energy measurement system is implemented without an integrator device. Such integrator device generally track input signals with a delay corresponding to 1/sC (the 1/sC formulation is the standard Laplace representation of, in this case, a first-order integrator) and are typically too slow to respond to short signals, and to accurately measure energy level of fast-changing signals such as short-pulsed laser emissions. Particularly, as noted, an integrator arrangement typically includes a resistive element (R) and a capacitive element (C). The capacitive element is charged to a voltage (through the resistor) representative of the energy level of the incident radiation. However, once the charging current ceases, the capacitor discharges. If the current representative of incident radiation is short lived, the voltage level of the capacitor would not be maintained long enough to enable an accurate measurement of the current. Thus, the requirement of measurement accuracy, requiring a relatively short time constant (computed as R*C) usually conflicts with the requirement for a relatively long hold time which requires a relatively large time constant (R*C).

Referring to FIG. 1, a block circuit diagram of an exemplary energy measurement system 100 is shown. The energy measurement system 100 includes a sample-and-hold module 120 that is configured to generate a signal (analog or digital) representative of an energy level of a short pulse radiation emission (e.g., laser beam) generated by a radiation source device, e.g., a laser device such as a Q-switch 532 Nd:YAG laser (not shown in FIG. 1). The sample-and-hold module 120 receives as input signals generated by a sensor circuit 110 that senses at least a portion of the laser radiation generated by the laser device and in response to the sensed radiation generates a signal whose strength (e.g., current level) is proportional to the energy level of the radiation incident on the photodiode, and thus proportional to the overall energy levels of the radiation generated and emitted by the laser device. In some embodiments, the sensor circuit 110 includes a photo-detector such as, for example, a photodiode 112. The photodiode 112 converts incident radiation into either current or voltage (depending on the mode of operation). Particularly, radiation incident on photodiode devices excites, for example, electrons in an exposed PN junction section of the photodiode such that resultant positively-charge electron holes formed in the PN junction move towards the photodiode's anode whereas the resultant excited electrons move towards its cathode, thus resulting in an electrical current whose level is proportional to the strength of the incident radiation. In some embodiments, other types of sensors (e.g., photo-detectors), such as photo-transistors may be used in addition to, or instead of, photodiodes.

As noted, the current generated as a result of radiation incident on the photodiode 112 is proportional to the level of energy of, for example, a pulse of incident laser radiation. Particularly, a single pulse of an incident radiation beam (not shown in FIG. 1) will excite electrons in the photodiode's semiconductor materials in proportion to the level of energy of the pulse. Therefore, the stronger the radiation level incident on the photodiode 112, the higher the resultant current that will be generated by the photodiode 112. Similarly, the longer the pulse incident on the photodiode 112 (in terms of duration), the more current will be generated by the photodiode as a result.

As shown in FIG. 1, the sample-and-hold module 120 includes an energy storage element, such as a hold (or sampling) capacitor 122. During the period that a pulse of the laser radiation is active, current will flow from the photodiode 112 and be stored on the hold capacitor 122. Thus, the charge accumulated on the hold capacitor 122 will be proportional to the level of energy of a pulse of the laser radiation. An operational amplifier 124 is arranged in a non-inverting configuration such that the hold capacitor 122 is electrically coupled to the positive terminal of the operational amplifier 124. Resistors 126 (R2) and 128 (R3) are connected to form the negative feedback loop from the output of the operational amplifier to the negative input terminal of the operational amplifier 124. Suitable operational amplifiers that may be used in the implementation of the sample-and-hold module 120 include commercially available amplifiers like those manufactured by, for example, Analog Devices, Texas Instruments, Linear Technology, etc. The first gain stage generally has significant bandwidth characteristics to enable for gain to be added without sacrificing frequency response. The gain value may depend on the signal strength of the radiation incident on the photodiode and/or the resultant current generated by the photodiode. The values of the resistors 126 and 128 may be chosen so that, in some embodiments, the operational amplifier has a gain of, for example 1-3.02 V/V. The non-inverting input of the operational-amplifier 124 generally has a very high impedance (e.g., greater than 1 GΩ) which consequently reduces the capacitor leakage current from the hold capacitor 122 and thus improves the accuracy of the sample-and-hold module 120.

After the voltage of the hold capacitor 122 has been sampled, the capacitor is cleared by grounding the positive side through an analog switch 121 (shown schematically in FIG. 1). Control of the analog switch 121 may be realized using a controller module 102. As will become apparent below, upon a determination that the energy measurement system 100 has completed the measurement operation and has outputted the measured energy level of the pulse, the controller module 102 generates a control signal to actuate the switch 121 so as to ground the capacitor 122. In some embodiments, the controller module 102 may include one or more programmable processing-based devices executing one or more computer programs to perform control operations of the energy measurement system 100. Alternatively and/or additionally, the controller module 102 may include special purpose logic circuitry, e.g., an FPGA (field programmable gate array) or an ASIC (application-specific integrated circuit) to perform some or all of the control operations of the controller module 102. The controller module 102 may also include one or more memory storage media and/or devices for storing instructions and data. The controller module 102 is configured to communicate with the modules of the energy system 100 through hardwired electrical connections and/or through wireless connections.

Thus, in operation, during the period in which a pulse of the radiation source device is active, at least a portion of the radiation (e.g., 3.5% of the radiation strength of a generated beam) is incident on a photodiode 112, and causes the photodiode to generate a current proportional to the radiation level of the laser beam. The hold capacitor 122 accumulates charge during the period that the laser pulse is active. When the pulse ceases, the capacitor 122 will have accumulated a charge level commensurate to the strength and duration of the radiation pulse that was incident on the photodiode. The charge level stored on the capacitor will consequently result in a corresponding voltage level that is provided to the positive terminal of the operational amplifier 124, thus resulting in an operational output voltage, $V_{out}$, 129 having a value corresponding to the product of the voltage level of the capacitor 122 and the gain of the operational amplifier. The output voltage 129 is therefore an amplified signal that is proportional (and thus representative) of the energy level of the radiation pulse.

As also shown in FIG. 1, the output of the hold-and-sample module 120 is electrically coupled to a filtering-and-amplification module 140. The filtering and amplification module 140 is configured to perform, for example, signal processing on the signal outputted from the sampling capacitor. Exemplary processing that may be performed on the signal outputted from the sample-and-hold module includes, for example, performing low-pass filtering on that signal. Generally, a photodiode's generated current will include an inherent noise signal component that has to be accounted for when amplifying the output. Thus, in some embodiments, the first low pass filter is used to reduce this photodiode noise, and also to reduce the switching noise from the analog switch used to clear the sample capacitor. The filtering-and-amplification module 140 also provides additional gain and filtering for the signal.

More particularly, in some embodiments, the filtering-and-amplification module 140 includes low-pass filter 142, implemented using, for example, a resistor 144 (R5) coupled in series to a capacitor 146 (C2). In some embodiments, the values of the resistor 144 and the capacitor 146 are selected so as to implement a low-pass filter with a −3 dB cutoff frequency of approximately 3.1 MHz. The low pass filter is connected (i.e., via the terminal of the capacitor 146 connecting it to the resistor 144) to the positive terminal of an operational amplifier 148. Like the operational amplifier 124 of the hold-and-sample module 120, the operational amplifier 148 of the filtering-and-amplification module 140 is arranged in a non-inverting configuration. The stage gain of the operational amplifier may be controlled through a digital potentiometer 150 (R7) which is controlled externally through a 3-wire serial (SPI) interface 152. Thus, by controlling the resistance of the potentiometer 150, the gain of the operational amplifier can be adjusted to have a value in the range of, for example, 1 to 6.035 V/V. In some embodiments, each step of the potentiometer can add approximately 0.02 V/V per step. Adjustment of the gain enables using the entire range of the output values of the energy measurement system 100. For example, in implementation in which the energy measurement system has a range of discrete output values of 0-4095, the gain of the filtering-and-amplification module 140 (and/or the gain of the other modules) can be adjusted so that the maximum signal level that can be formed at the sample-and-hold module 120 causes an output value of approximately 2000±100 counts which is equivalent to a full scale reading. Additionally, the remaining range of the A/D converter (2001 to 4096) may be used to detect a laser output 100% greater than the value requested. For example, if the operator requires 10 millijoules (the maximum laser output) this could correspond to a count of 2000. If the laser device happens to put out more than 10 millijoules, the additional range (2001 to 4096) would enable measurement of the excess energy condition. Adjustment of the potentiometer step can be performed either manually or through electrical actuation controlled, for example, by the controller module 102 generating and/or transmitting control signals to adjust the step settings of the potentiometer 150. Processing performed by the filtering-and-amplification module 140 results in an amplified signal 154 of the signal 129 outputted by the sample-and-hold module 120. The resultant amplified signal 154 is thus also proportional to the level of charge that was stored on the holding capacitor 122, and therefore the signal 154 has a value (e.g., voltage or current value) that is proportional (and thus representative) of the energy level of the laser radiation produced by the laser device.

The filtered and amplified signal 154 is provided as input to a processing module 160 configured to process the signal and convert the processed signal to a digital signal that can thereafter be processed by, for example, a processor-based device, or be displayed. In some embodiments, the signals 154 is first processed by a low-pass filter 162 to remove any noise contained in the signal 154 with the resultant filtered signal being provided as input to the processing module 160. Optionally, additional filtering may be performed on the signal using another filter realized by, for example, the resistor (R40) 163 and the capacitor (C6) 164 to further reduce the noise level in the signal. In some embodiments, the filter 164 is a low-pass filter having a −3 dB cutoff frequency of, for example, 319 kHz, to remove at least some of the noise added to the signal in preceding stages of the energy measurement system 100. The filter, implemented using the op-amp 165 (marked U2A), may be used when the signal level from the photodetector is very low, or when the noise level is high.

A signal 166 (which may have been filtered by one or more low-pass filter stages) is provided as input to an ADC converter 168. In some embodiments, the ADC converter 168 is implemented as a single-ended 12-bit converter. A suitable 12-bit ADC converter is an AD7476 converter manufactured by Analog Devices. A 12-bit converter can output 4096 discrete values representative of the energy level of the laser emission generated by the laser device. To generate a digital signal representative of a laser emission, it is necessary to establish the relationship between the values of signals received as input by ADC converter 168 and the laser emission produced by the laser device. Accordingly, the ADC (or more generally, the energy measurement system 100) may be calibrated prior to commencing regular operation of the energy measurement system to enable performing substantially accurate measurements of the energy level of radiation emissions. Details regarding exemplary embodiments of calibration procedures to establish the relationship between the energy levels of the laser emission and the analog signal levels provided as input to the ADC converter are described, for example, in concurrently filed U.S. patent application entitled "Method and System to Calibrate Laser Devices", the content of which is hereby incorporated by reference in its entirety. Generally, the energy level of the radiation incident on the radiation sensor of the energy measurement system is varied (e.g., by using an attenuator) to cover a range of values from some low energy level to some high energy level. The energy level incident on the radiation sensor may be independently measured by an external calibrated energy meter. For each energy level corresponding to incident radiation, a corresponding resulting value (or count) is produced by the ADC 168. The resulting values produced by the ADC 168 and their corresponding energy levels (as determined, for example, by the external energy meter) are used to determine the relationship (e.g., represented by a linear equation) between the energy levels and values outputted by the ADC 168. It should be noted that, in general, energy measurements systems have to be calibrated separately for different types of therapy applications used because the corresponding energy ranges used for different therapy applications tend to vary.

The use of a 12-bit ADC converter to digitally represent energy levels in the range of, for example, 0-20 mJ (the laser device typically has emissions with a total energy per pulse of 20 mJ) may result in a converter resolution of approximately 0.0049 mJ/step (20 mJ/4096 converter steps≈0.0049 mJ/step). In circumstances where a different resolution is required, the range of possible radiation levels and/or the bit-count output of the ADC converter 168 may be varied. The output of the ADC converter 168 is a sequence of 12 bits representative of the energy level of the laser emission generated by the laser device.

In some embodiments, the conversion of the analog to digital representation having a 12-bit binary value is performed in approximately 2.4 microseconds. The ADC 168 may sample and convert the signal 129 produced by the sample-and-hold module 120 one or more time (e.g., 4 times) and provide the converted signal to, for example, the controller module 102, which may then determine an average, or some other representative output value based on the values provided by the ADC 168. Performing multiple sampling and conversion operations generally improves the reliability and accuracy of the results obtained by the energy measurement system 100. The determined value computed by the controller module 102 may then be provided to a display device (not shown), or forwarded to some other module for further processing.

As noted, in some embodiments, when the ADC has completed the conversion of the signal of the sample-and-hold module 120 (i.e., after outputting the 12-bit output for the last sample taken by the energy measurement system) the controller 102 may send an actuating signal to the analog switch 121 to cause the holding capacitor 122 to be grounded, thus clearing the capacitor and readying the energy measurement system 100 to receive and measure the next pulse generated by the radiation source with respect to which the energy measurement system is used.

In some embodiments, the energy measurement system includes pulse detection functionality that detects the occurrence of a laser pulse, and in response thereto, generates and transmits a pulse to the controller circuitry of the energy measurement system to cause it to measure the pulse energy level stored on the holding capacitor 122. In some embodiments, the pulse detection circuitry generates a TTL compatible pulse to be received and acted upon by the controller circuitry (e.g., the controller module 102) of the energy measurement system. The use of pulse detection thus enables the energy measurement system to avoid measuring samples resulting from spurious signals (signals not corresponding to generated emissions) and to better synchronize the energy measurement functionality with the occurrence of pulses (e.g., so that measurement of the energy level based on the charge level stored on the capacitor 122 does not begin too early or too late).

Specifically, and as shown in FIG. 1, the pulse detection functionality is implemented, in some embodiments, using a high-pass filter module 180 and a pulse detector and stretcher module 190. The high-pass filter reduces the low frequency noise which may cause low frequency triggering of the pulse detect circuit. The high-pass module 180 is connected to the output terminal of the operational-amplifier 124 such that it receives an amplified signal corresponding to the signal stored at the holding capacitor 122 at about the same time that a signal on the capacitor 122, corresponding to the current generated from the excitation of the photodiode 112 by the incident radiation, is formed. The signal presented as input to the high-pass filter module 180 is filtered and amplified, and the amplified output signal is provided to the pulse detector and stretcher module 190 which determines if the signal provided to it as input is a signal resulting from an occurrence of a emission pulse from a laser device, and if so, the module 190 generates a TTL signal having a voltage level and a duration sufficient to cause the signal processing functionality of the system 100 (e.g., the analog-to-digital conversion functionality) to be performed.

The high-pass filter module 180 is implemented using, for example a capacitor 182 (C7) coupled in series to a resistor 184 (R11). In some embodiments, the values of the capacitor 182 and resistor 184 are selected so as to implement a High-pass filter with a −3 dB cutoff frequency of approximately 100 KHz. The high-pass filter is connected (i.e., via the terminal of the capacitor 182 that is connected to the resistor 184) to the positive terminal of an operational amplifier 186. The operational amplifier 186 of the high-pass filter module 180 is arranged in a non-inverting configuration. The stage gain of the operational amplifier may be controlled by suitable selection of resistors connected between the output terminal of the operation-amplifier 186 and its negative terminal (e.g., suitable value selection for resistors 188a (R12) and 188b (R13)). In some embodiments, a suitable gain in circumstances in which a laser system such as the one depicted in FIG. 2 (described in greater details below) has been determined to be 6.667 V/V. In other circumstances, other amplification gains, realized through different component value selections, may be used. In some embodiments, a capacitor (C8) 189 may be added to the feedback loop (i.e., between the operational-amplifier's output and negative terminal) to enable control the realized gain. For example, the amplifier implemented using the operational-amplifier 186 may be arranged in a non-inverting configuration with a DC gain of 7.64 V/V (as may be determined by the values of the resistors 188a and 188b). The addition of, for example, a 10 pF negative feedback capacitor, may reduce the gain to 6.90 V/V at 100 kHz.

The pulse detector and stretcher module 190 includes two comparators 192a and 192b. The comparator 192a is arranged so as to perform a threshold evaluation to determine if the signal received from the output of the high-pass filter module 180 corresponds to a signal generated as a result of the occurrence of a radiation emission pulse. The output signal of the module 180 is directed to the positive input terminal of comparator 192a. The negative terminal of comparator 192a is connected, through an arrangement of passive components (e.g., resistors R16 and R17, and capacitor C9) to a voltage source $V_{cc}$. By a suitable selection of the values of the passive components, the particular threshold voltage used by the comparator can be selected. The Threshold voltage may be determined based on the equation, $V_{threshold}=R17/(R16+R17)*V_{cc}$. Thus, the signal provided by the module 180 to comparator 192a is compared to the voltage level presented at the other input terminal of comparator 192a. If the signal provided by the module 180 is above the threshold voltage, the output at comparator 192a will be set to the maximum output value (e.g., +5V), corresponding to a logical high. Conversely, if the signal provided by the module 180 is below the threshold voltage, the output voltage of comparator 192a will be set to its minimum value (e.g., 0 V), corresponding to a logical low. In some embodiments, the threshold voltage may be selected to be, for example, 500 mV. Thus, if, for example, the signal outputted by the high-pass filter module 180 has a signal level higher than 500 mV, a radiation emission pulse is deemed to have occurred.

The output of comparator 192a is provided to the positive input of comparator 192b through a resistive divider R19 and R18. The resistor combination of R19 and R18 reduces the voltage at the positive input of 192b by some pre-determine factor, e.g., 0.5. Thus, through a suitable selection of the values of the passive components, the particular voltage provided to the positive input of 192b can be selected. When the output of comparator 192a is set to a logical high, the output of comparator 192b will also be set to a logical high (because the configuration implemented using the comparator 192b, the voltage level at the positive terminal of comparator 192b is higher than the voltage level at the negative input terminal, thus causing the output 194b of comparator 192b to be set to a logical high). Subsequently, the capacitor 197 of the RC circuit arrangement 196 coupling the output 194b of the operational-amplifier 192b to its negative input will begin charging. The voltage at the negative terminal of comparator 192b will thus increase. When the voltage level at the negative terminal reaches the voltage level at the positive terminal of comparator 192b, the output voltage of comparator 192b will switch to its minimum value (e.g., 0 V). Because the output 194b is coupled to the positive input terminal of the operational-amplifier 192a, the voltage level at that terminal will be lower than the voltage level at the negative terminal of the comparator 192a, causing the output voltage of the comparator 192a to switch to its minimum value (e.g., 0 V).

The time period required for the second comparator configuration (corresponding to comparator 192b) to change the output voltage level at the output 194b of the operational-amplifier 192b is based on the values of the resistor (R17) and capacitor 197 (C10). In some embodiments, the values of the resistor R17 and capacitor 197 (C10) can be selected so that the time it takes for the negative terminal of the operational-amplifier 192b to reach the voltage level at the positive terminal is, for example, approximately 10 microseconds. Other time periods may be selected and implemented instead. Accordingly, through selection of suitable RC values, the logical high output of the first operational-amplifier 192a used to implement the first comparator can be maintained for a desired time period. Thus, the second comparator circuit arrangement causes the detected pulse to effectively be stretched from, for example, 4 nanoseconds, to 10 microseconds, and therefore enable to the controller module to track the output of the module 190. As noted, in response to the detection of a pulse, the controller module 102 may cause the signal resulting from the photodiode current stored on the capacitor 122 to be converted to a digital signal.

After the output of comparator 192a has been reset to its minimum value (e.g., corresponding a logical low), upon the occurrence of a subsequent radiation emission, the output of the comparator 192a will again be set to a high, and remain at that state for a period of time based on the values used to implement the RC circuit 196.

Other mechanisms and/or circuit arrangements may be used to implement pulse detection and/or pulse stretching functionality for the energy measurement system 100.

Figure 2:
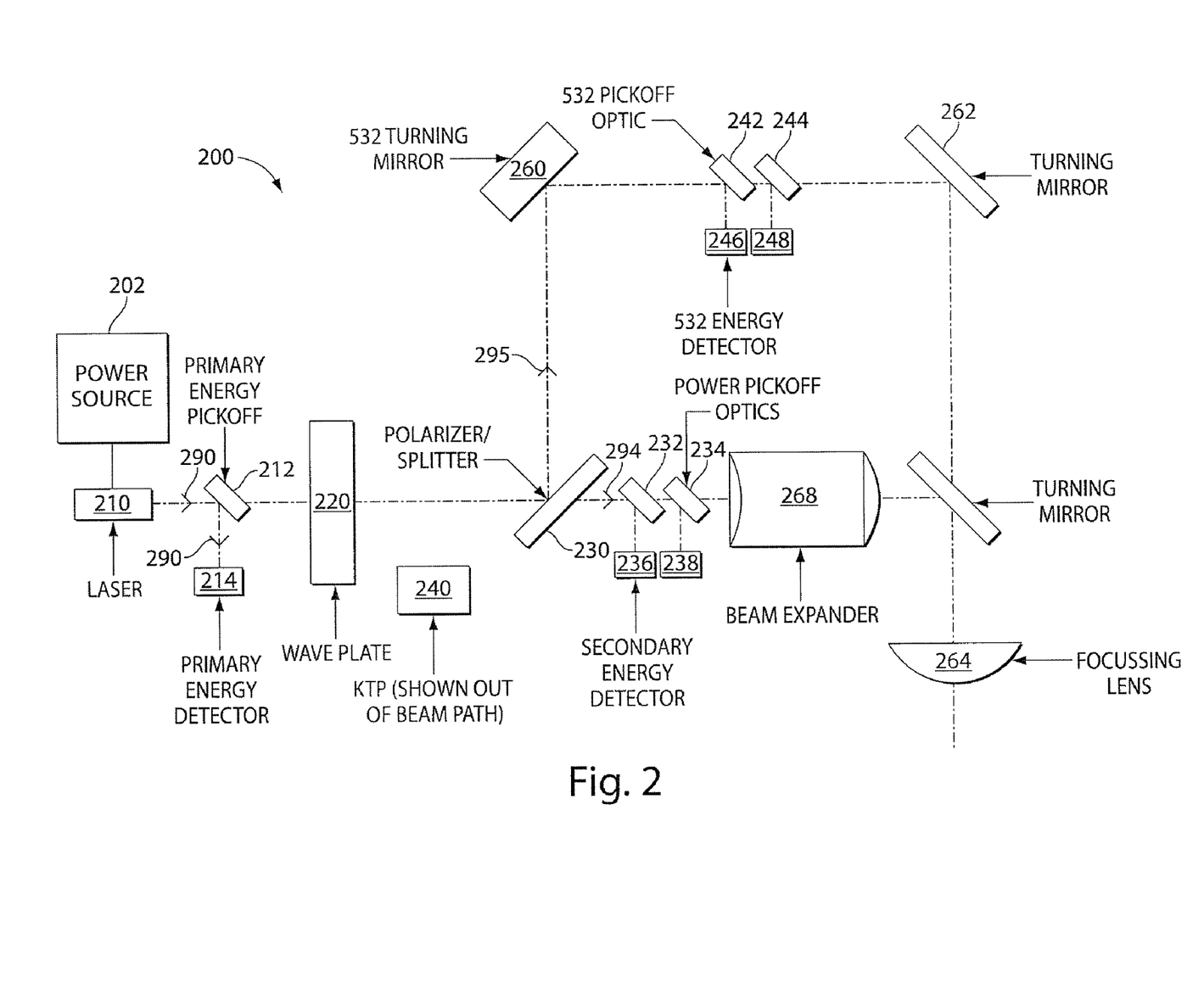
FIG. 2 is a schematic diagram of an exemplary laser system that uses devices similar to the energy measurement systems of FIG. 1.

The energy measurement system described herein can be used to measure the energy levels of short radiation emission pulses (e.g., laser pulses) generated by laser systems. Referring to FIG. 2, a schematic diagram of an exemplary laser system 200 is shown. In some embodiments, the laser system 200 may be a dual-path ophthalmic laser system to enable an operator to select a mode of treatment to be administered to a patient by altering the configuration of the system by, for example, inserting a suitable optical element into the light path, e.g., a frequency multiplier 240 such as a KTP crystal. As shown, the laser system 200 includes a laser device 210 to generate and emit laser radiation. The laser device 210 may be any suitable laser, including, for example, a Q-switched Nd:YAG laser operating in the infrared spectrum at, for example, a wavelength of 1064 nm and having pulse widths of, for example, less than 5 nanoseconds. A laser operating in pulsed mode, e.g., a Q-switched Nd:YAG includes an optical switch that is inserted in the laser cavity that open upon reaching a maximum population inversion (i.e., achieving a state in which sufficient atoms in the laser cavity are in an excited state), thus resulting in an emission one or more pulses. Other laser devices, such as, for example Nd:YLF lasers, Yb:YAG lasers, etc., may also be employed. The laser device 210 is configured to fire one or more pulses based on the voltage level applied to it by a power source 202. Generally, a particular voltage level (referred to as a threshold voltage) associated with the laser device 210 will cause a single pulse emission to occur, whereas other threshold voltage values associated with the laser device will cause additional pulses to be emitted. The threshold value for a laser device operating in pulsed mode depends, at least partly, on the laser device's temperature.

In some embodiments, radiation 290 emitted by the laser device 210 is measured by an energy measurement device 214 configured to determine whether one or more radiation pulses have been emitted by the laser device 210 and/or measure the energy level associated with radiation pulses generated and discharged by the laser device (i.e., the radiation source). Generally, the occurrence of radiation pulses is measured closer to the source point of the radiation emission because the occurrence of pulses becomes more difficult as the radiation level degrades and becomes attenuated farther away from the source, thus increasing the likelihood that a false determination of a pulse occurrence would be made by an energy measurement device. The energy device 214 is thus disposed in relative physical proximity to the output port of the laser device and can thus measure energy levels at a point where little, if any, radiation level attenuation has occurred to the source radiation 290. Energy measurements devices that are positioned close to the source generating device are referred to as primary energy detectors (or PEM—Primary Energy Monitor). The emitted radiation 290 is generally directed at an optical beam splitter 212 that causes most of the energy to continue propagating in substantially the same direction the emission was traveling at before crossing the splitter, while diverting a small portion of the radiation (e.g., 3.5% of the energy in the radiation incident on the splitter 212) towards the energy measurement device 214, e.g., at an angle of approximately 90° relative to the direction of propagation of the radiation emission 290. Beam splitter 212 is generally an optic coated for 1064 nm, and configured to extracts, for example, 3.5% of the treatment beam as it passes through it.

As noted, the energy measurement device 214 may be implemented in a manner similar to the implementation of the energy system 100. As such, the radiation incident on the energy measurement device 214 may cause a photodiode detector incorporated in the device to generate current at a level proportional to the level of the diverted radiation 292, and thus in proportion to the source radiation emission 290. A pulse detector circuit, implemented, for example, in a manner similar to the arrangements of the high-pass filter module 180 and pulse detector and stretcher module 190, detects the occurrence of the pulse, and generates a control signal that is directed to the controller module of the energy measurement device. Subsequently, the signal formed by the charge accumulated on the holding capacitor of the energy measurement device 214 (representative of the energy level of the radiation emission 290) is filter and amplified, and directed into an analog-to-digital converter of the device 214 that converts the signal to a digital value representative of the energy level of the radiation emission 290.

The portion of the source radiation 290 not diverted to the energy measurement device 214 is directed, in some embodiments, to an attenuator, such as, for example, a half-wave plate attenuator 220. The attenuator 220 is configured to attenuate the energy level of the incident radiation to a level suitable for therapeutic application. For example, in some embodiments, the laser device 210 may generate laser radiation having an energy level of 20 mJ. Therapeutic application, on the other hand, may require energy levels lower than that (e.g., in the range of 1-10 mJ).

The half-wave plate attenuator 220 is configured to resolve linearly polarized light (the radiation emissions produced by the radiation device 210 are, in some embodiments, linearly polarized) entering a half-wave plate into two waves, e.g., a wave parallel to the optical axis of the plate and a wave perpendicular to the optical axis of the wave plate. In the half-wave plate 220, the parallel wave propagates slightly slower than the perpendicular one such that at the far side of the plate, the parallel wave is approximately half of a wavelength delayed relative to the perpendicular wave, thus and the resulting waves is orthogonally polarized compared to its entrance state. The half-wave plate 220 thus reflects certain portions of the wavelength spectrum and transmits other portions.

The level of attenuation (and thus the level of energy of the exiting radiation) may be controlled, for example, by changing the orientation/position of the half-wave plate attenuator 220 relative to the source radiation source 210, controlling the temperature of the attenuator 220, and other mechanisms and/or procedures for controlling and/or regulating the radiation entering the half-wave plate attenuator. For example, in some embodiments, the attenuator 220 is implemented using a birefringent material which may be mechanically or electrically controlled to vary the amount of polarization rotation it produces. Such a birefringent half-wave plate may be rotatable about an axis substantially parallel to the propagation path of the laser beam and having its optic axis aligned, for example, perpendicular to the axis of rotation. The relative angular position of the half-wave plate implementation of the variable attenuator relative to the general propagation direction of the incoming input radiation emission may be controlled, for example, using a rotational mechanism. Rotational mechanisms may include a motor (e.g., an electrical motor) that rotates the half-wave plate. Control of the half-wave plate could be provided, for example, by a stepper motor utilizing a gear reduction ratio (e.g. 64:1) to provide an accurate wave plate position. The stepper motor controller provides the signals required to move the stepper motor. The stepper motor has a gear attached to the output shaft. The motor gear interfaces with a larger gear on the wave plate assembly. The ratio between the motor drive gear and wave plate gear is 2.75:1.

In some embodiments, the laser system 200 may be operated at two wavelengths. Specifically, in one configuration, radiation for use in photodisruptive (PD) treatment procedures (e.g., to treat conditions such as secondary cataract) may be required. Treatment of PD is generally performed with radiation emissions at around 1064 nanometers and energy levels of, for example, 0.3-10 mJ in an 8-10 μm spot. Thus, in performing PD treatment procedure using a laser source emitting radiation at approximately 1064 nanometer, the energy level direct to the treatment area may need to be adjusted (e.g., by adjusting the attenuator 220).

In another configuration, radiation with a wavelength suitable for performing Selective Laser Trabeculoplasty (SLT) to treat, for example, glaucoma, may be required. Treatment of SLT is generally performed with radiation emission at around 532 nanometers (i.e., radiation frequency approximately double the radiation frequency required for PD treatments) and energy levels of, for example, 2 mJ, or less, in an 8-10 μm spot. To obtain radiation emission with the required SLT wavelength of approximately 532 nanometers a frequency multiplier device 240, for example, a KTP crystal, may be disposed between the half-wave plate attenuator 220 and a beam splitter 230. The frequency multiplier device 240 may be placed into the light path manually, or automatically, for example by a motor activated by a button depressed by the operator of the device. In some embodiments, the frequency multiplier device 240 may be disposed along other points in the optical paths depicted in FIG. 2. For example, the frequency multiplier device 240 may be disposed at a point beyond the beam splitter 230 used to direct the radiation from the half-wave plate 220 along an optical path 294 corresponding to the PD treatment procedure or along a path 295 corresponding to the SLT treatment procedure.

Beam splitter 230 (also referred to as a separator-polarizer) may transmit and/or reflect varying amounts of the incident light based on its polarization direction. In some embodiments, the reflectance at splitter 230 due to polarization direction may be mostly attributed to light, whose wavelength is in the IR region. Accordingly, by adjusting the half-wave plate attenuator 220, the intensity of light in the IR region may be affected after being reflected off or transmitted by the splitter 230. For example, the adjustment of the half-wave plate 220 may lead to a P-polarization pattern of the light in the IR region striking the beam splitter 230 such that a substantial portion of the radiation, e.g., more than 95% of the radiation energy for a wavelength of 1064 nm, may be transmitted through the beam splitter 230 and into the PD path 294. On the other hand, if the adjustment of the half-wave plate attenuator 220 leads to an S-polarization pattern of the light, which may be in the IR region, a substantial portion of the radiation, e.g., more than 98% of the radiation energy for a wavelength of 1064 nm, may be reflected by the beam splitter 230. Thus, the light may be reflected into the SLT path 295.

As further shown in FIG. 2, positioned along the optical paths at points beyond the position of the beam splitter 230 are one or more additional energy measurement devices, each of which may be implemented in a manner similar to the energy measurement system 100 and/or the energy measurement device 214. Energy measurement devices positioned to detect and measure the energy of radiation processed (e.g., attenuated) by one or more optical devices (e.g., a half-wave plate attenuator) are referred to as secondary energy monitors (or SEM). In some embodiments, secondary energy monitors are implemented so that they include the energy measurement modules (e.g., the sample-and-hold module, the filter and amplify module and/or the processing module), but do not include the modules implementing the pulse-detection functionality (e.g., the modules 180 and 190 shown in FIG. 1). For example, a primary energy monitor (e.g., the energy measurement device 214) may be configured to perform the pulse-detection operations (the energy level of radiation incident on a primary energy monitor is generally higher than the energy level of the radiation at point farther down the optical path), and communicate, through electrical and/or wireless connections, control signals indicating detection of a pulse to other energy measurement devices deployed in the laser system 200.

Thus, the system 200 includes energy measurement devices 236 and 238 which receive portions of the radiation directed along the path 294 (e.g., radiation at wavelength of, for example, 1064 nanometers, and energy levels of up to 10 mJ, for performing PD treatment procedures) and, based on the signal samples held at their respective sample-and-hold modules, determine the energy levels corresponding to the radiation propagating along the optical path 294. The portion of radiation incident on the radiation sensor of the energy measurement device 236 (e.g., a corresponding photodiode of that energy measurement device) is, in some embodiments, 3.5% of the energy of the radiation directed by the beam splitter 230 along the path 294. The portion of radiation incident on the radiation sensor of the energy measurement device 238 is, for example, 3.5% of the remaining energy level of the radiation that was not diverted to the energy measurement device 236. The portions of radiation directed to these respective devices are diverted by energy diverters 232 and 234, which are similar to the diverter 212 used to divert the portion of the source radiation 290 to the energy measurement device 214.

The use of two or more energy measurement devices (devices 236 and 238 in the embodiment depicted in FIG. 2) along the optical path 294 may enable more reliable energy measurements as the separate independent measurement devices can provide measurement corroboration. Additional devices may be deployed along the path 294 to improve the reliability of the energy measurements. It is to be noted that prior to commencing regular operation of the energy measurement devices 236 and 238, the devices may be calibrated to determine the relationship between the energy measured and indicated by the energy measurement devices, and the energy level of the radiation being directed to the target area to be treated. That calibration may be done to determine the relationship in situation where radiation emissions for PD treatments are being used (different relationships are determined when the radiation emissions are for SLT treatments). Because the energy measurement devices 236 and 238 may be detecting different energy levels (because, for example, the energy measurement device is positioned farther down the path than the device 236), the two measurement devices have to, in some embodiments, be calibrated separately and independently.

Likewise, the system 200 includes energy measurement devices 246 and 248 which receive portions of the radiation directed along the path 295 (e.g., radiation at wavelength of, for example, 532 nanometers, and energy levels of up to 2 mJ, for performing SLT treatment procedures) and, based on the signal samples held at their respective sample-and-hold modules, determine the energy levels corresponding to the radiation propagating along the optical path 295. The path 295 along which the radiation propagates is defined, for example, by use of optical devices such as turning mirrors 260 and 262. As with the energy measurement devices 236 and 238, the radiation incident on the devices' respective radiation sensors is diverted by optical diverters, such as diverters 242 and 244.

In some embodiments, the radiation propagating along either of the paths 294 or 295 is directed to a steering optic (not shown), e.g., a fold mirror, an optical fiber, etc., that transmits the radiation to the target area (e.g., a patient's eye). The radiation may be coupled to such a waveguide using, for example, a focusing lens 264.

Other wavelengths may be suitable for other ophthalmic applications, in which case the frequency multiplier device 240 may triple or quadruple the wavelength of the light emitted from laser module 210. In some applications, a tunable frequency multiplier device, such as an optical parametric oscillator, may be used. Other optical elements, for example, lenses, beam shapers, attenuators and the like may be used in some embodiments. As shown, in some embodiments a beam expander 268 to expand an incoming beam (e.g., from 3 mm to 30 mm) may be placed in the optical path 294.

Additional descriptions of laser systems which may include one or more of the energy measurement systems/devices described herein are provided, for example, in U.S. patent application Ser. No. 11/399,623 (PG Publication No. 2007/0093794), entitled "Device, System and Method for Dual-Path Ophthalmic Device," the content of which is hereby incorporated by reference in its entirety.

Figure 3:
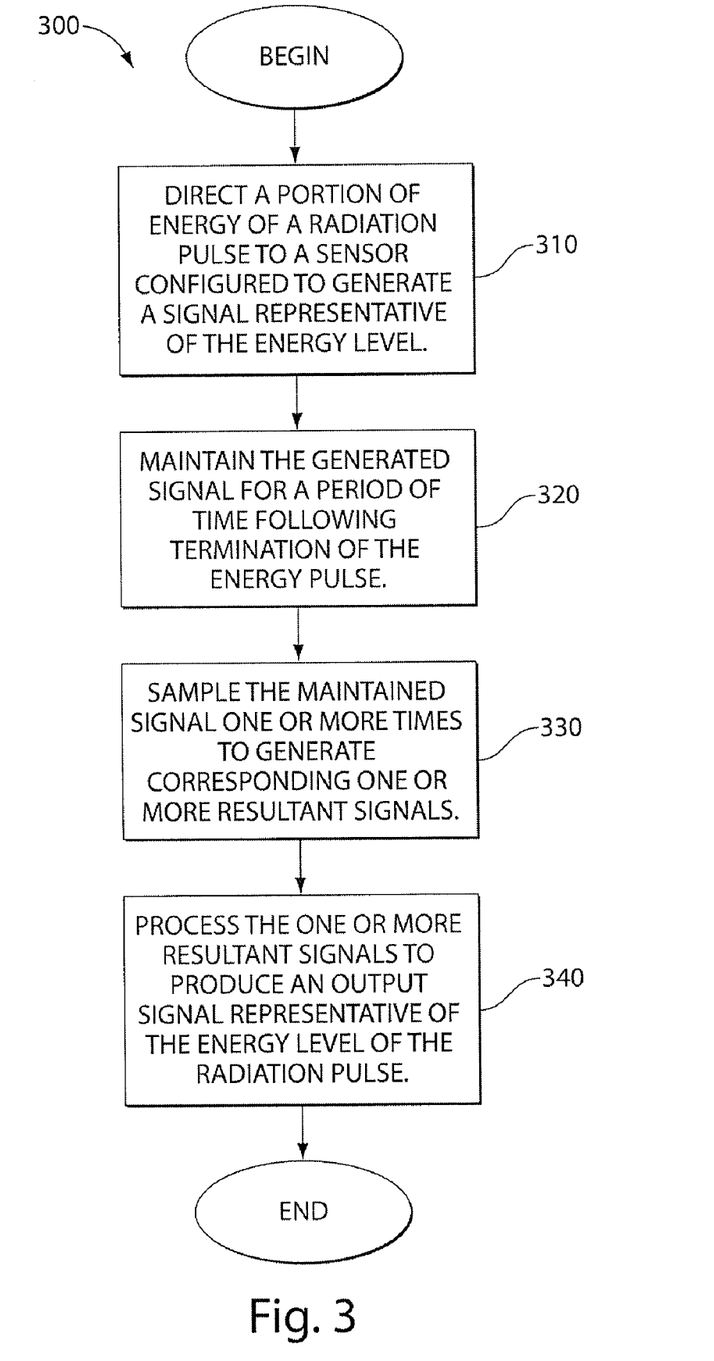
FIG. 3 is a flowchart of an exemplary procedure to measure energy levels of a radiation pulse.

Referring to FIG. 3, a flowchart of an exemplary procedure 300 to measure energy levels of a radiation pulse is shown. To measure the energy level of a radiation pulse, for example, a short-pulsed laser radiation, at least a portion of radiation produced by a radiation source (e.g., a laser source, such as laser source 210 shown in FIG. 2) is directed 310 to a sensor (e.g., photodiode) configured to generate a signal representative of the energy level of the radiation. The sensor may be part of an energy measurement system such as the energy measurement system 100 and/or the energy measurement devices 214, 236, 238, 246 and/or 248. Directing the at least the portion of the radiation can be performed by an optical diverter, or beam splitter, such as the splitter 212, 232, 234, 242 and/or 244 shown in FIG. 2. The signal generated by the sensor is maintained 320 for some period of time following the termination of the pulse to enable sampling of the signal. In some embodiments, current produced by a photodiode is maintained on a storage element such as the holding capacitor 122 shown in FIG. 1. The charge accumulated on the capacitor 122 during the time the incident radiation pulse is active is proportional to the overall energy level of the radiation whose energy level is to be measured.

The maintained signal is sampled 330 one or more times to generate corresponding one or more resultant intermediate signals that may be filtered and/or amplified, or otherwise processed, to improve the quality of the intermediate signals. The one or more resultant signals are processed 340 to produce an output signal representative of the energy level of the radiation pulse. Processing of the intermediate signals produced through the sampling operation may include, for example, performing analog-to-digital conversion operations.

A number of embodiments of the invention have been described. Nevertheless, it will be understood that various modifications may be made without departing from the spirit and scope of the invention. Accordingly, other embodiments are within the scope of the following claims.

What is claimed is:

1. A system to measure the energy level of a radiation pulse, the system comprising:
   a sample-and-hold module to measure the radiation pulse, the sample-and-hold module configured to generate a signal representative of an energy level of the radiation pulse, the sample-and-hold module comprising:
      a photo detector to generate electrical current in response to at least a portion of the radiation pulse incident on the photo detector, and
      an energy storage component to accumulate electrical charge from the electrical current generated by the photo detector during a period that the radiation pulse is active, the accumulated charge being representative of duration and strength of the radiation pulse, wherein the accumulated charge corresponds to a resultant voltage that is measured subsequent to completion of the period of the radiation pulse; and
   a processing module to determine an energy value of the radiation pulse based on the signal generated by the sample-and-hold module in response to a determination that a detected emission resulting in the generated signal corresponds to a laser pulse.

2. The system of claim 1 wherein the photo detector of the sample-and-hold module comprises:
   a photodiode to generate electrical current in response to at least a portion of the radiation pulse incident on the photodiode, the level of generated electrical current being proportional to the energy level of the radiation pulse.

3. The system of claim 1 wherein the level of electrical charge stored on the energy storage component during one period of the radiation pulse is representative of the energy level of the radiation pulse.

4. The system of claim 1 wherein the energy storage component includes a capacitor.

5. The system of claim 1 further comprising:
   a gain-and-filtering module coupled to an output of sample-and-hold module, the gain-and-filtering module configured to:
   amplify the signal representative of an energy level of the radiation pulse; and
   provide the amplified signal to the input of the processing module.

6. The system of claim 1 further comprising:
   a pulse-detect module to determine the occurrence of the emission.

7. The system of claim 1 wherein the system is implemented without an integrator circuit.

8. The system of claim 1 wherein the sample-and-hold module is configured to measure a short-pulse laser beam having a pulse duration of substantially between 1 nanosecond and 1 millisecond.

9. A system to measure the energy level of a radiation pulse, the system comprising:
   a sample-and-hold circuit to measure the radiation pulse, the sample-and-hold module configured to generate a signal representative of an energy level of the radiation pulse, the sample-and-hold module comprising:
      a photo detector to generate electrical current in response to at least a portion of the radiation pulse incident on the photo detector, and
      an energy storage component to accumulate electrical charge from the electrical current generated by the photo detector during a period that the radiation pulse is active, the accumulated charge being representative of duration and strength of the radiation pulse, wherein the accumulated charge corresponds to a resultant voltage that is measured subsequent to completion of the period of the radiation pulse; and
   a processing circuit to determine an energy value of the radiation pulse based on the signal generated by the sample-and-hold module in response to a determination that a detected emission resulting in the generated signal corresponds to a laser pulse.

10. The system of claim 9 wherein the photo detector of the sample-and-hold circuit comprises:
    a photodiode to generate electrical current in response to at least a portion of the radiation pulse incident on the photodiode, the level of generated electrical current being proportional to the energy level of the radiation pulse.

11. The system of claim 9 further comprising:
    a gain-and-filtering circuit coupled to an output of sample-and-hold circuit, the gain-and-filtering circuit configured to:
    amplify the signal representative of an energy level of the radiation pulse; and
    provide the amplified signal to the input of the processing circuit.

12. A radiation system to transmit radiation, the system comprising:
    a radiation source to generate a radiation pulse; and
    one or more energy measurement devices, at least one of the one or more energy measurement devices comprising:

a sample-and-hold module to measure the generated radiation pulse, the sample-and-hold module configured to generate a signal representative of an energy level of the generated radiation pulse, the sample-and-hold module comprising:
- a photo detector to generate electrical current in response to at least a portion of the radiation pulse incident on the photo detector, and
- an energy storage component to accumulate electrical charge from the electrical current generated by the photo detector during a period that the radiation pulse is active, the accumulated charge being representative of duration and strength of the radiation pulse, wherein the accumulated charge corresponds to a resultant voltage that is measured subsequent to completion of the period of the radiation pulse; and
- a processing module to determine an energy level of the radiation pulse based on the signal generated by the sample-and-hold module in response to a determination that a detected emission resulting in the generated signal corresponds to a laser pulse.

13. The system of claim 12 wherein the radiation source comprises a laser device configured to generate short-pulsed laser radiation.

14. The system of claim 12 wherein the photo detector of the sample-and-hold module of the at least one of the one or more energy measurement devices comprises:
a photodiode to generate electrical current in response to at least a portion of the radiation incident on the photodiode, the level of generated electrical current being proportional to the energy level of the generated radiation pulse.

15. The system of claim 12 wherein the level of electrical charge stored on the energy storage component during one period of the radiation pulse is representative of the energy level of the radiation pulse.

16. The system of claim 12 wherein the energy storage component includes a capacitor.

17. The system of claim 12 wherein the at least one of the one or more energy measurement devices further comprises:
a gain-and-filtering module coupled to an output of sample-and-hold module, the gain-and-filtering module configured to:
amplify the signal representative of the energy level of the radiation pulse; and
provide the amplified signal to the input of the processing module.

18. The system of claim 12 wherein the at least one of the one or more energy measurement devices further comprises:
a pulse-detect module to determine the occurrence of the emission.

19. The system of claim 12 wherein the at least one of the one or more energy measurement devices is implemented without an integrator circuit.

20. The system of claim 12 wherein the sample-and-hold module of the at least one of the one or more energy measurement devices is configured to measure a short-pulse laser beam having a pulse duration of substantially between 1 nanosecond and 1 millisecond.

21. A method to measure energy level of a radiation pulse, the method comprising:
directing at least a portion of the radiation pulse to a sensor configured to generate a signal representative of the energy level of the radiation;
maintaining the generated signal for a period of time following termination of the radiation pulse, wherein maintaining the generated signal comprises accumulating electrical charge from electrical current generated by the sensor, during a period that the radiation pulse is active, on a storage component, the accumulated charge being representative of duration and strength of the radiation pulse;
sampling the maintained signal one or more times to generate corresponding one or more resultant signals, wherein sampling the maintained signal includes measuring a resultant voltage corresponding to the accumulated charge subsequent to completion of the period of the radiation pulse; and
processing the one or more resultant signals to produce an output signal representative of the energy level of the radiation pulse in response to a determination that a detected emission resulting in the generated one or more signals corresponds to a laser pulse.

22. The method of claim 21 wherein directing the at least the portion of the radiation pulse comprises:
directing the at least a portion of the radiation pulse to a photodiode configured to generate electrical current in proportion to the directed at least the portion of the radiation pulse.

23. The method of claim 21 wherein maintaining the signal for the period of time following termination of the radiation pulse comprises:
storing the current generated by the photodiode on a storage element.

24. The method of claim 21 further comprising:
detecting the occurrence of the emission.

25. The method of claim 21 wherein directing at least a portion of the radiation pulse comprises:
directing at least a portion of a laser radiation pulse, the pulse having a duration of substantially between 1 nanosecond and 1 millisecond.

* * * * *